United States Patent [19]

Wong

[11] Patent Number: 5,042,763
[45] Date of Patent: Aug. 27, 1991

[54] SELF-LEVELING PORTABLE CAMERA SUPPORT APPARATUS

[76] Inventor: William W. M. Wong, 9969 Fox, Riverside, Calif. 92503

[21] Appl. No.: 461,260

[22] Filed: Jan. 5, 1990

[51] Int. Cl.⁵ .............................................. E04G 3/00
[52] U.S. Cl. .................................. 248/178; 248/281.1
[58] Field of Search ...................... 248/122, 123.1, 124, 248/178, 179, 281.1, 585, 324, 586, 587, 274; 33/299, 291; 403/56; 74/60, 110

[56] References Cited

U.S. PATENT DOCUMENTS

| | | | |
|---|---|---|---|
| 1,078,577 | 11/1913 | Fox | 248/586 |
| 1,993,485 | 3/1935 | Paul | |
| 2,015,869 | 10/1935 | Pulz | |
| 2,370,611 | 2/1945 | DuMais | |
| 2,771,826 | 11/1956 | Shapiro | |
| 3,133,719 | 5/1964 | Beck | |
| 3,661,308 | 5/1972 | Walters | |
| 3,952,982 | 4/1976 | Lewis | |
| 4,327,986 | 5/1982 | Carter | |
| 4,447,031 | 5/1984 | Souder, Jr. | 248/281.1 |
| 4,523,732 | 6/1985 | Biber | 248/123.1 |
| 4,657,217 | 4/1987 | Kiesel | 248/281.1 |
| 4,795,118 | 1/1989 | Kosugi | |

FOREIGN PATENT DOCUMENTS 271729 6/1988 European Pat. Off. ............ 248/178

*Primary Examiner*—Ramon O. Ramirez
*Assistant Examiner*—Robert A. Olson
*Attorney, Agent, or Firm*—William L. Chapin

[57] ABSTRACT

A device for maintaining the line of sight of a camera level comprises a hollow cylindrical standard having a plurality of equal-length rigid rods longitudinally slidably contained within said cylinder. Ball-shaped tips on opposite ends of each rod are held within circumferentially spaced-apart sockets in the base of an upper camera support cap, at the upper ends of each rod, and in within similar sockets in the upper surface of a lower base cap. Thus constructed, the upper camera support cap may be moved pivotably with respect to the lower base cap, while maintaining the plane of the upper camera support cap parallel to the lower mounting surface of the base cap.

11 Claims, 5 Drawing Sheets

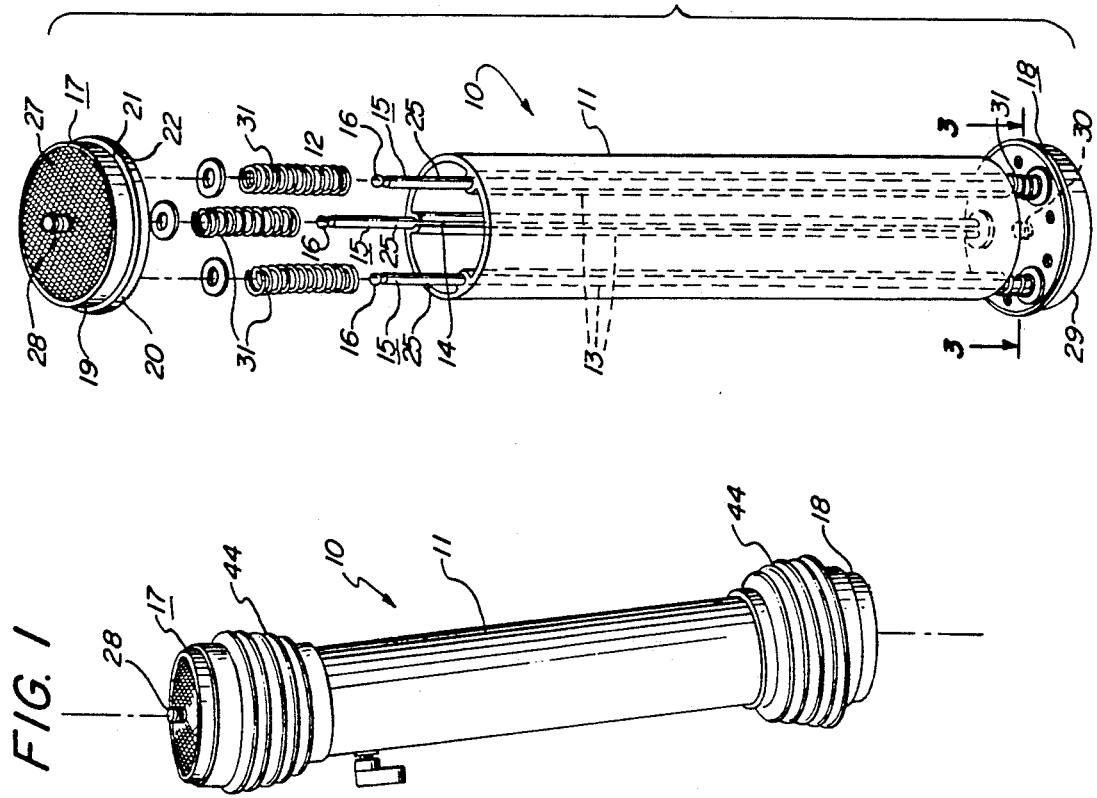
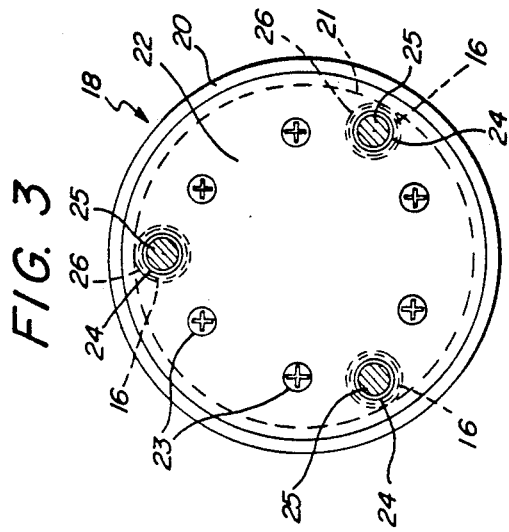
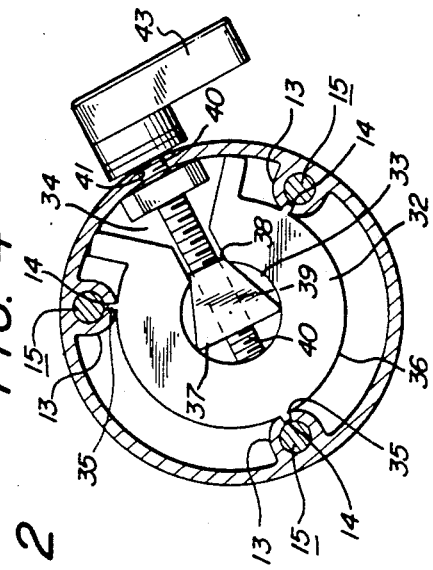

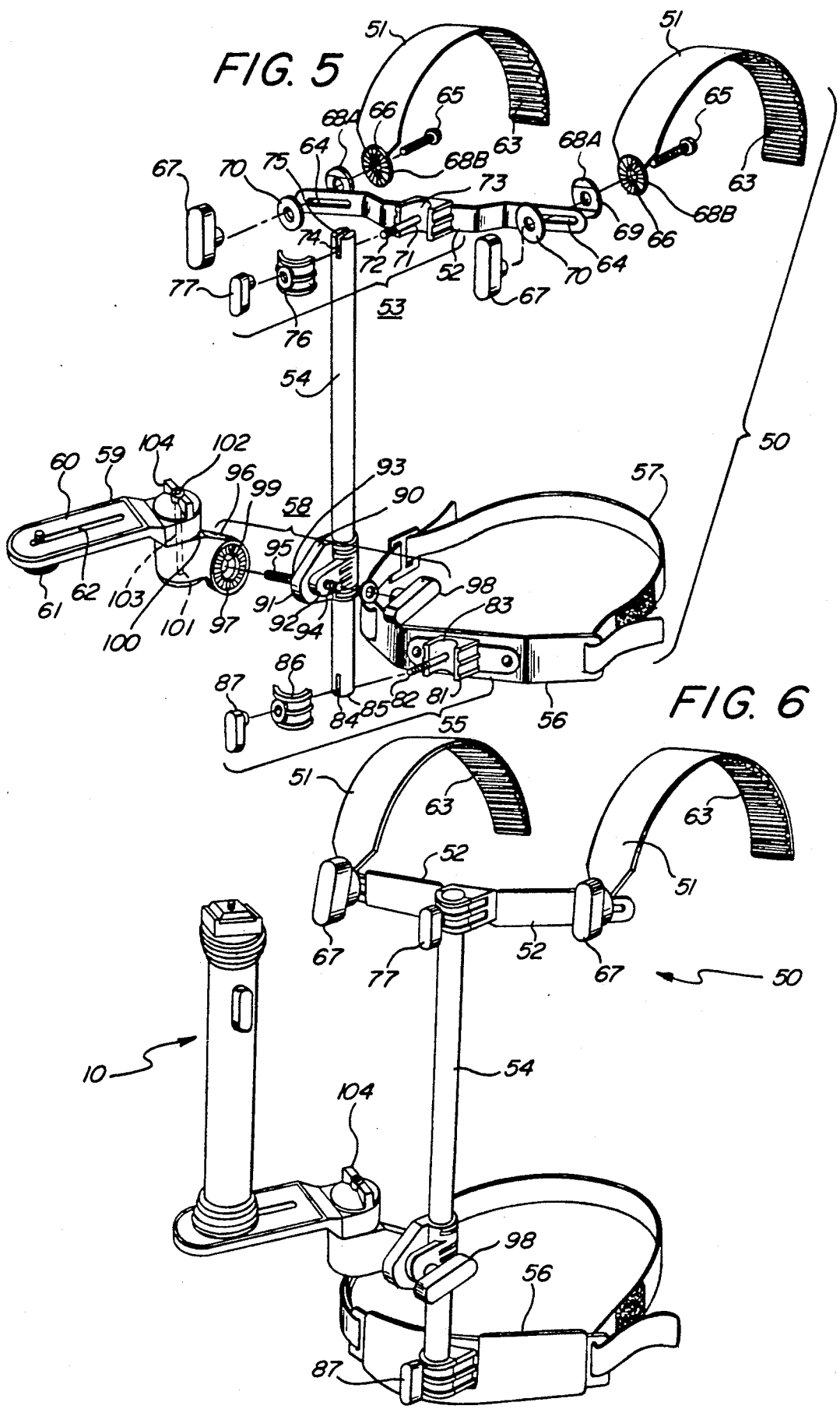

SELF-LEVELING PORTABLE CAMERA SUPPORT APPARATUS

BACKGROUND OF THE INVENTION

A. Field of the Invention.

The present invention relates to devices for supporting cameras. More particularly, the invention relates to portable devices for supporting video cameras, camcorders and still cameras in a manner facilitating their convenient use to photograph fixed or moving subjects.

B. Description of Background Art.

In the early history of cameras, tripods were commonly used to support a camera while it was being used to photograph a subject. A tripod was required because the substantial weight of early cameras made it difficult or inconvenient to hold the camera while filming. Also, the low sensitivity of early films necessitated a relatively long exposure time. This, in turn, required that the camera be maintained motionless with respect to the subject for longer periods than could be practically achieved by holding the camera in one's hands, unaided by any mechanical means. For, if the camera were moved, a blurred image would result.

Modern still cameras are substantially smaller and lighter than their early predecessors. Also, the greater sensitivity of modern photographic films permits shorter exposure times. Thus, a substantial proportion of photography with still cameras is now done without the aid of a tripod. Oftentimes, the camera is held in a ready-to-use position by means of a flexible strap looped around the neck of the photographer. The camera is then grasped by hand and brought close to the eye of the photographer when it is desired to frame a subject within the field of view of the camera's viewfinder, prior to actuating the shutter release button of the camera.

Now that video cameras and camcorders are widely available, the weight of such equipment again has become an important consideration to both amateur and professional video photographers. Typical video cameras or camcorders, although small and convenient to use, are substantially larger and heavier than modern still cameras. Therefore, it would be desirable to provide means for supporting such video cameras or camcorders on the body of the photographer, in a manner which is comfortable and convenient, yet allowing the camera to be quickly and easily moved into a position in which the viewfinder of the camera is adjacent the eye of the photographer.

A number of devices have been disclosed for use with still cameras or related optical devices which might be used to support a video camera or camcorder on the body of a photographer. Those devices which the present inventor is aware of are disclosed in the following United States Patents.

Paul, U.S. Pat. No. 1,993,485, Mar. 5, 1935, Portable Camera Support.

Pulz, U.S. Pat. No. 2,015,869, Oct. 1, 1935, Support For Portable Optical Instruments.

Du Mais, U.S. Pat. No. 2,370,611, Feb. 27, 1945, Camera Support.

Shapiro, U.S. Pat. No. 2,771,826, Nov. 27, 1956, Adjustable Camera Support.

Beck, U.S. Pat. No. 3,133,719, May 19, 1964, Support For Optical Devices.

Walters, U.S. Pat. No. 3,661,308, May 9, 1972, Camera and Binocular Chest Support Frame.

Lewis, 3,952,982, Apr. 27, 1976, H All Angle Camera Mount with Vernier Adjustment.

Carter, U.S. Pat. No. 4,327,986, May 4, 1982, Mobile Camera Support.

Kosuci, U.S. Pat. No 4,795,118, Jan. 3, 1989, Camera Supporting Device.

None of the prior art devices which the present inventor is familiar with has the capability of supporting a camera on a frame attached to the body of a photographer which allows the camera to be moved to various active photographing positions or rest positions, while maintaining the line of sight of the camera in a horizontal plane. Accordingly, the present invention was conceived of.

OBJECTS OF THE INVENTION

An object of the present invention is to provide an apparatus for supporting optical equipment such as a video camera, camcorder or still camera in a manner permitting translational movement of the camera, while maintaining the optical axis or line of sight of the camera parallel to a fixed plane.

Another object of the invention is to provide a camera support apparatus which extends from a fixed mounting base to a camera, and allows translational motion of the camera with respect to the mounting base, while maintaining the line of sight of the camera parallel to a plane fixed in space.

Another object of the invention is to provide a camera support apparatus which automatically maintains the line of sight of the camera level as the camera is translated with respect to a fixed mounting base of the support apparatus.

Another object of the apparatus is to provide a self-leveling, portable support apparatus for cameras which permits orbital motion of the camera with respect to a fixed mounting base while maintaining the line of sight of the camera horizontal.

Another object of the invention is to provide a portable camera support apparatus adapted to being attached to the body of a photographer and supporting the camera without the use of the hands.

Another object of the invention is to provide a portable camera support apparatus which is adapted to attachment to the body of a photographer and allows a camera supported by the apparatus to be pivotably moved with respect to the body, while maintaining the line of sight of the camera parallel to a fixed plane.

Another object of the invention is to provide a portable camera support apparatus which is removably fastenable to a fixed object such as an automobile door, and allows a camera supported by the apparatus to be pivotably moved with respect to the object, while maintaining the line of sight of the camera parallel to a fixed plane.

Various other objects and advantages of the present invention, and its most novel features, will be particularly pointed out hereinafter in connection with the appended claims.

It is to be understood that although the invention disclosed herein is fully capable of achieving the objects and providing the advantages mentioned in this specification, the structural and operational characteristics of the invention described herein are merely illustrative of the preferred embodiments. Accordingly, I do not intend that the scope of my exclusive rights and privileges in the invention be limited to the specific embodiments described, but only to those embodiments delineated in the appended claims, and to those equivalents and adaptations reasonably inferable therefrom.

SUMMARY OF THE INVENTION

Briefly stated, the present invention comprehends a novel for supporting a camera from a fixed mounting base, in which the camera may be pivotably moved with respect to the mounting base, while maintaining the line of sight of the camera parallel to a fixed plane. Thus, for example, a camera supported by the novel apparatus according to the present invention may be positioned with its line of sight horizontal, and swung towards or away from the eye of a photographer, while maintaining the line of sight of the camera horizontal. The novel support apparatus thus permits the photographer to maintain a subject level in the field of view of the camera, in spite of motion of the camera relative to the photographer as he alternately moves the camera viewfinder closer to his eye while filming a subject, and away from his eye while pausing between filming sequences.

The basic embodiment of the novel self-leveling camera support apparatus according to the present invention includes a hollow standard having externally the shape of an elongated cylindrical tube. An upper, camera support cap and a lower, base cap located above and below the upper and lower transverse ends, respectively, of the tube, are pivotably fastened to one another by means of rods extending through the tube. The novel method of joining the caps to the tube permits the tube to be tilted from an initial position in which the longitudinal axis of the tube is initially perpendicular to the upper and lower flat surfaces of the upper and lower caps, respectively, to positions in which the axis of the tube is oblique to those surfaces, while the upper and lower cap surfaces are maintained parallel to one another. Thus, if the lower surface of the lower cap of the support apparatus is initially fixed parallel to a horizontal surface, such as a table top, a camera mounted onto the upper surface of the upper cap will maintain its line of sight horizontal in spite of pivotal motion of the tube which results in translational movement of the upper cap relative to the lower cap.

In the novel camera support standard according to the present invention, three identical rigid, elongated straight support rods are longitudinally slidably contained within tubular channel tubes on the inner cylindrical wall surface of the cylindrical tube comprising the main body of the standard. The tubular channel tubes are spaced apart at 120 degree circumferential angles, are parallel to the longitudinal axis of the standard, and are coextensive in length with the standard.

Identical ball-shaped tips are formed in upper and lower ends of each support rod. The support rods are longer than the cylindrical tube, and the upper and lower ball-shaped tips of the rods extend above and below the upper and lower annular transverse walls, respectively, of the cylindrical tube.

The upper ball-shaped tips of the support rods are pivotably held within hemispherically-shaped cavities or sockets formed in the lower wall surface of an inverted cup-shaped upper cap. In an exactly similar fashion, the lower ball-shaped tips of the support rods are pivotably held within hemispherically-shaped sockets in the upper wall surface of a cup-shaped lower cap.

Six compression springs encircling the upper and lower ends of the three rods and positioned between the respective adjacent cap and transverse wall of the standard tube bias the caps approximately equal distances away from opposite ends of the standard tube. The ball and socket joints formed between the ends of the rods and the caps permit the caps to be tilted in any direction with respect to the caps, while maintaining the upper and lower surfaces of the caps parallel to one another. A collar located inside the standard tube permits adjustable, radially directed frictional pressure to be exerted on the support rods. This permits the ease of slidability of the support rods within the tubes, and therefore the ease of tiltability of the support device, to be adjusted to a desired value.

In a preferred embodiment of the novel self-leveling camera support apparatus according to the present invention, the lower base cap of the self-leveling camera support standard is removably attached to a frame which is attachable to the body of a photographer. In another embodiment of the invention, the novel camera support standard is removably attached to a different type frame which is adapted to removable attachment to an automobile door.

BRIEF DESCRIPTION OF THE DRAWINGS

FIG. 1 is a perspective view of a novel self-leveling camera support standard according to the present invention.

FIG. 2 is an exploded perspective view of the device of FIG. 1.

FIG. 3 is a transverse sectional view of the device FIG. 2, taken along line 3—3 of FIG. 2

FIG. 4 is another transverse sectional view of the device of FIG. 1, taken along line 4—4 of FIG. 1.

FIG. 5 is an exploded perspective view of a camera support frame adapted to attachment to the body of a photographer and adapted to receiving the camera support standard of FIGS. 1-4.

FIG. 6 is a perspective view of the camera support standard of FIGS. 1-4 attached to the frame of FIG. 4.

DETAILED DESCRIPTION OF THE INVENTION

Figure 8:
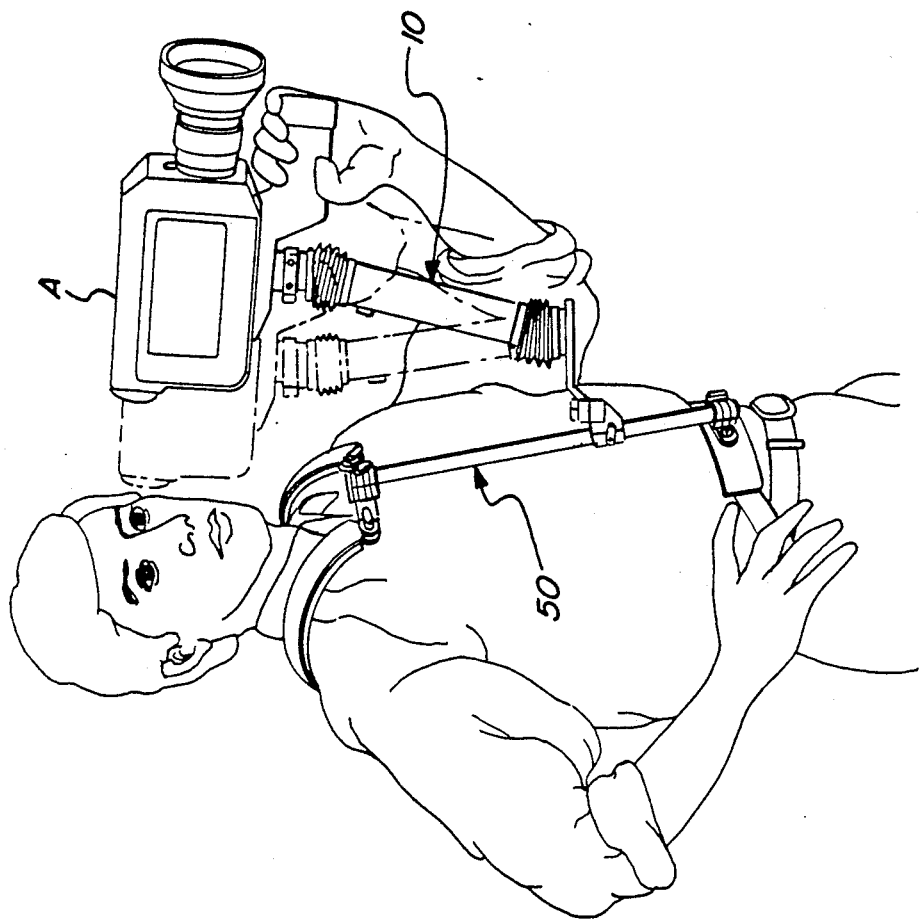
FIG. 8 is a perspective view similar to that of FIG. 7, but showing the camera pivoted away from the photographer's head, while maintaining the line of sight of the camera horizontal.

Referring now to FIGS. 1-4, a novel self-leveling camera support standard according to the present invention is shown. As shown in FIGS. 1-4, the self-leveling camera support standard 10 according to the present invention includes an elongated hollow cylindrical body 11. Body 11 is preferably made of a lightweight, rigid material such as aluminum.

As may be seen best by referring to FIG. 2, cylindrical body 11 has formed in or attached to its inner wall surface 12 three tubular channel tubes 13. Tubular channel tubes 13 are disposed parallel to the longitudinal axis of body 11, are spaced apart from each other at 120-degree circumferential angles, and are of the same length as the cylindrical body. Each channel tube 13 has a longitudinally disposed slot 14 in that portion of the cylindrical wall surface of the channel closest the longitudinal axis of body 11. As will become apparent from the description of the purpose of slots 14 below, the slots need not extend the entire length of channel tubes 13. For ease of fabrication, however, slots 14 may extend the entire length of channel tubes 13, especially if body 11 and channel tubes 13 with slots 14 are fabricated as a unitary structure, as by an extrusion process, for example.

As shown in FIG. 2, each of the three channel tubes 13 slidably contains an elongated, straight support rod 15. Each of the three support rods 15 are identical to one another, and of a length greater than the common length of body 11 and channel tubes 13.

Support rods 15 are symmetrical about a transverse central plane, and have formed in opposite ends thereof a ball-shaped head 16.

Camera support standard 10 includes an upper camera cap 17 and a substantially identically shaped lower base cap 18. Upper cap 17 has a generally circular plan-view cross-sectional shape, and has the general appearance of an inverted cup of slightly larger diameter than cylindrical body 11. The upper cap 17 has an upper cup-shaped portion 19 having a bottom annular section 20 of larger diameter than the upper portion of the upper cap. An annular shoulder flange 21 is thus formed at the intersection between the upper portion and bottom annular section 20 of upper cap 17. A disk-shaped lower cover lid 22 of slightly smaller diameter than the inner diameter of annular section 19, and of larger diameter than shoulder flange 21 is seated on the shoulder flange and held in that position by means of screws 23.

Lid 22 of upper cap 17 has three holes 24 through its thickness dimension, which are each aligned with a separate one of the three support rods 15. Holes 24 are of larger diameter than the shanks 25 of support rods 15, but of smaller diameter than ball-shaped head 16 of a support rod. Thus, the ball-shaped heads 16 of rods 15 are held captive between the inner facing circular wall surfaces of upper cup-shaped section 19 and lower lid section 22 of upper cap 17.

In the preferred embodiment of support standard 10, sockets 26 are provided inside cap 17 for receiving the ball-shaped heads 16 of support rods 15. Sockets 26 are fixed relative to lid 22, and allow pivotable motion of the cap 17 relative to the support rods 15, while preventing longitudinal motion of the cap relative to the rods.

Lower base cap 18 is substantially identical in structure and function to upper camera support cap 17. Also, the method of pivotably fastening the lower ball-shaped ends 16 of support rods 15 to lower base cap 18 is substantially identical to the method of fastening the upper ball-shaped ends to upper camera support cap 17 as described above, and that description will therefore not be repeated.

Upper camera support cap 17 and lower base cap 18 differ only in the following respect. As shown in FIG. 2, the upper circular wall 27 of upper camera support cap 17 has a coaxial, perpendicularly upwardly projecting threaded stud 28 for threadingly engaging a standard threaded tripod mounting insert of the type provided on a lower mounting surface of most cameras. On the other hand, as shown in FIG. 2, the lower circular wall surface 29 of lower base cap 18 has a coaxial, threaded hole 30 for receiving a standard threaded camera mounting stud of the type which protrudes upwards from the mounting plate of most camera tripods.

Figure 7:
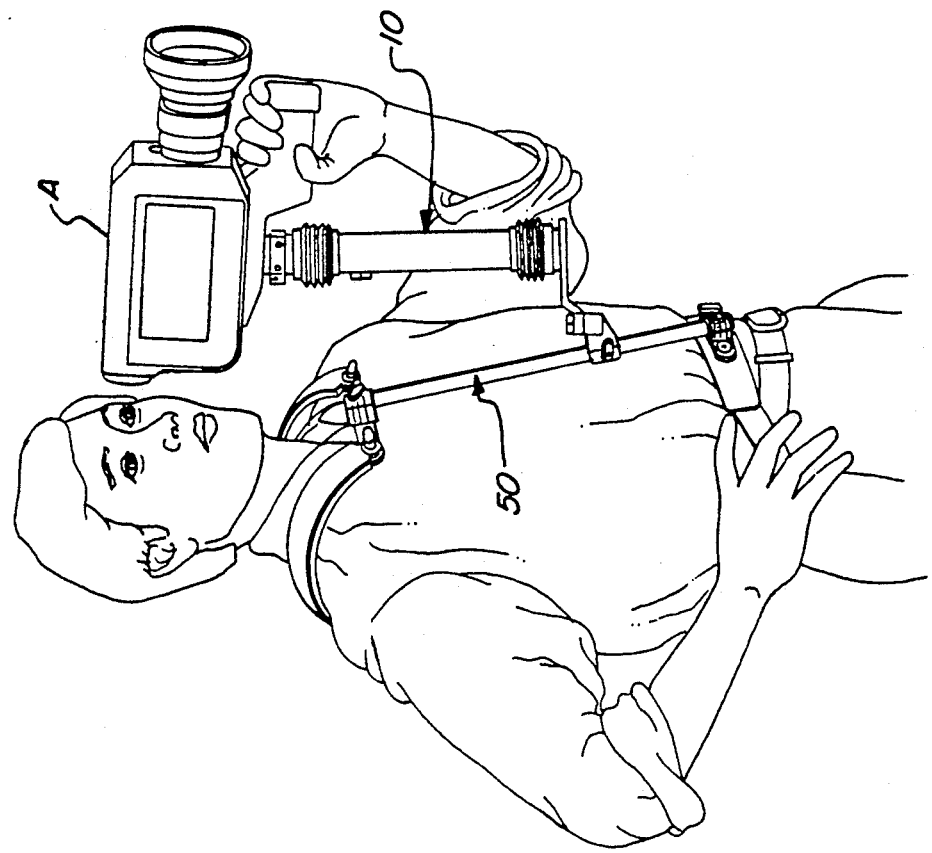
FIG. 7 is a perspective view of the apparatus of FIG. 6, showing the apparatus supporting a video camera in a position in which the view finder of the camera is close to the eye of a photographer.

As may be seen best by referring to FIG. 2, upper camera support cap 17 and lower base cap 18 are biased to longitudinal positions approximately equidistant from the respective transverse ends of cylindrical body 11 by means of six helical compression springs 31 encircling support rods 15 and positioned between the body and the adjacent cap. Thus constructed, the upper wall 27 of upper camera support cap 17 and lower wall 29 of base cap 18 will be constrained to be parallel to one another regardless of tilting of the caps relative to the longitudinal axis of body 11. This novel construction of camera support standard 10 makes the device self-leveling, permitting the upper camera support cap 17 and an attached camera to be pivoted or swung to any position within an imaginary cone whose vertex is fixed in the center of base cap 18, while maintaining the upper wall 27 of the upper camera support cap 17, and the camera line of sight, parallel to the lower wall 29 of lower base cap 18. Thus, if a camera A supported by the device 10 has its line of sight initially horizontal, as shown in FIG. 7, the camera may be pivoted in any direction, as shown in FIG. 8, while maintaining the line of sight of the camera horizontal.

In a test model of the novel self-leveling camera support standard 10 according to the present invention, cylindrical body 11 of the device had a diameter of approximately 2 inches, and a length of approximately 7½ inches, while support rods 15 had an approximate length of 9¾ inches. These dimensions permitted the upper camera support cap 17 of standard 10 to be pivoted to any position within a 60 degree cone whose vertex coincided with the entrance to threaded hole 30 on the lower surface of base cap 18, while maintaining the camera support cap parallel to base cap 18.

In the preferred embodiment of self-leveling camera support standard 10, means are provided to frictionally resist the longitudinal motion of support rods 15 in channel tubes 13 to an adjustable degree. By limiting the ease of longitudinal motion of support rods 15 relative to body 11 of the support standard 10, the standard will tend to remain in a position to which it is tilted. The structure and method for frictionally limiting longitudinal motion of support rods 15 in channel tubes 13 may best be understood by referring to FIG. 4. As shown in FIG. 4, a generally circularly-shaped friction element 32 of uniform thickness is positioned coaxially within cylindrical body 11. Friction element 32 is made from a resilient material such as rubber, has a central coaxial hole 33 through its thickness dimension, and a pie-shaped cutout 34 extending radially outwards from the hole. Three generally rectangular plan-view lugs 35 project radially outwards from the outer circumferential wall 36 of friction element 32. Lugs 35 are spaced apart at 120 degree circumferential angles, and are of the proper size and location to project into slots 14 of channel tubes 13 and frictionally engage the outer cylindrical wall surfaces of support rods 15 within the channel tubes.

Wedged within central coaxial hole 33 of friction element 32 is a trapezoidal-shaped wedge 37 of generally uniform thickness. The smaller base wall 38 of wedge 37 has a threaded hole 39 which extends perpendicularly inwards from the base wall, such that the center line of the hole lies along a radius of the friction element 32.

A threaded rod 40 threadingly engages threaded hole 39 or wedge 37 and extends through a clearance hole 41 radially disposed through the cylindrical wall 42 of cylindrical body 11. A knob 43 attached to the outer end of threaded rod 40 allows wedge 37 to be advanced inwards or outwards from a central position within friction element 32, depending on whether the knob is turned clockwise or counterclockwise. As wedge 37 is advanced radially inwards, lugs 35 move radially outwards, causing the lugs to exert a larger frictional force on support rods 15. Conversely, turning knob 43 in a direction which withdraws wedge 37 from friction element 32 reduces the normal force which lugs 35 exert on support rods 15, thereby decreasing the frictional resistance to longitudinal motion of the support rods caused by the lugs.

As may be seen best by referring to FIGS. 1 and 2, a flexible cylindrical boot 44 may be positioned coaxially over each end of cylindrical body 11, the boot spanning the longitudinal distance between a transverse wall of the body and upper camera support cap 17 or lower base cap 18. Boots 44 are provided to prevent inadvertent contact of support rods 15, helical compression springs 31, and other components of the self-leveling mechanism of support standard 10 from inadvertent contact with foreign objects.

FIG. 5 illustrates a camera support frame which may be comfortably worn by a photographer, while providing a convenient mounting platform for the self-leveling camera support standard described above.

As shown in FIG. 5, camera support frame 50 includes a pair of curved shoulder plates 51 connected to opposite ends of a laterally disposed upper tube support plate 52. Upper tube support plate 52 has a clamp 53 for attachment to the upper end of a generally vertically disposed tube 54. The lower end of tube 54 is supported by a clamp 55 fastened to the center of a curved, transversely disposed torso plate 56. Torso plate 56 has fastened to its opposite lateral ends an adjustable strap or belt 57 adapted to securing the plate around the midriff of a photographer.

Curved shoulder plates 51 are adapted to fit over the shoulders of a photographer, as illustrated in FIGS. 7 and 8.

Camera support frame 50 includes a platform support clamp 58 adapted to attach to tube 54 at any desired position along the length of the tube. Platform support clamp 58 includes means for fastening a camera support arm 59 to the platform support clamp. Camera support arm 59 has a flat upper surface 60 adapted to supporting the bottom surface of a camera. The camera is secured to camera support arm 59 by means of a knurled screw 61 which extends upward through a longitudinally disposed slot 62 provided through the thickness dimension of the camera support arm. Screw 61 is used to threadingly engage a standard threaded tripod insert located on the bottom surface of most cameras. Alternatively, when camera support frame 50 is used in combination with self-leveling camera support standard 10, the camera support standard may be secured to camera support arm 59 by, means of knurled screw 61, as shown in FIGS. 6, 7 and 8.

The means for fastening camera support arm 59 of camera support frame 50 to platform support clamp 58 permits the support arm to be pivoted in horizontal and vertical planes, as will become apparent from a more detailed description of the elements of the camera support frame given below.

Referring now to FIGS. 5 and 6, curved shoulder plates 51 are fabricated from a flexible material such as aluminum which may be bent to a desired contour to fit comfortably over the shoulders of the photographer, and retain that shape. A strip of flexible resilient material 63 is desirably attached to the lower surface of each shoulder plate 51. Strip 63 is made from foam rubber or other soft resilient material which provides a comfortable feel to the wearer. Alternatively, shoulder plates 51 be enclosed by fabric covers, not shown.

As shown in FIGS. 5 and 6 upper tube support plate 52 has the general shape of an elongated rectangular strip of metal or other rigid material of generally uniform thickness and has a pair of symmetrical, longitudinally disposed slotted apertures 64 through its thickness dimension, located near opposite ends of the strip. Slotted apertures 64 are provided to receive fastening screws 65 which permit shoulder plates 51 to be joined to upper tube support plate 52 at a desired longitudinal position. Fastening is accomplished by means of screws 65 passed through clearance holes 66 in one end of each shoulder plate 51 and wing nuts 67 threaded onto screw 65. Preferably, mating radially castellated washes 68A and 68B are used to maintain a desired orientation between a shoulder plate 51 and upper tube support plate 52. To accomplish that function, the surface of one castellated washer 68A opposite the castellated surface contains a groove 69 adapted to fit over the width of tube support plate 52. Fastening of upper tube support plate 52 to curved shoulder plates 51 may be facilitated by flat washers 70, which provide a bearing surface as wing nut 67 is tightened on screw 65.

Upper tube support plate 52 includes a concave saddle 71 positioned midway between opposite longitudinal ends of the support plate. A threaded stud 72 extends perpendicularly outwards from upper tube support plate 52. Threaded stud 72 is centrally positioned within the concave surface 73 of saddle 71, and is adapted to engage a slotted aperture 74 provided in the upper transverse face 75 of tube 54, when the outer cylindrical surface of the tube is conformally seated in the concave surface of the saddle. Thus positioned, tube 54 is secured to saddle 71 by means of a C-shaped collar segment 76 having a hole 77 for receiving threaded stud 72, and a wing nut 77 tightened down onto the convex surface of the collar segment.

The lower end of tube 54 is fastened to torso plate 56 by means of structural elements exactly similar to those described above for the upper tube support plate 52. Thus, torso plate 56 has a concave saddle 81 located midway between opposite longitudinal ends of the torso plate, and has a threaded stud 82 projects perpendicularly outwards from the center of the concave surface 83 of saddle 81. Threaded stud 82 is adapted to engage a slotted aperture 84 provided in the lower transverse face 85 of tube 84. A C-shaped collar segment 86 having a hole 87 for receiving threaded stud 82 is provided. Tube 54 is secured to saddle 82 by means of a wing nut 87 tightened down onto the convex surface of the collar segment 86.

Platform support clamp 58 includes a split tubular section 90 which has radially outwardly extending flange sections 91 and 92. Flange sections 91 and 92 have aligned through-holes 93 and 94, respectively, for receiving a threaded rod 95. A base member 96 for supporting camera support arm 59 has on one vertical surface thereof a radially castellated seating surface 97 for securement against an outer surface of a flange section 91 of platform support clamp 58. When a wing nut 98 is tightened down on threaded rod 95 threaded into hole 99 in base member 96 and into an outer surface of flange section 92, the two flange sections are squeezed together, clamping the tubular section 90 of the platform support clamp 58 to tube 54, and also clamping base member 96 to split tubular section 90, at a desired adjustable elevation angle relative to tube 54.

Base member 96 has an upper mounting surface 100 having a perpendicularly inward or downward depending threaded hole 101 for receiving a screw 102 passed through a hole 103 through one, inner end of camera support arm 59. Thus, a wing nut 104 may be tightened on screw 102 to secure camera support arm 59 to base member 96 at any desired azimuth angle relative to tube 54.

Figure 9:
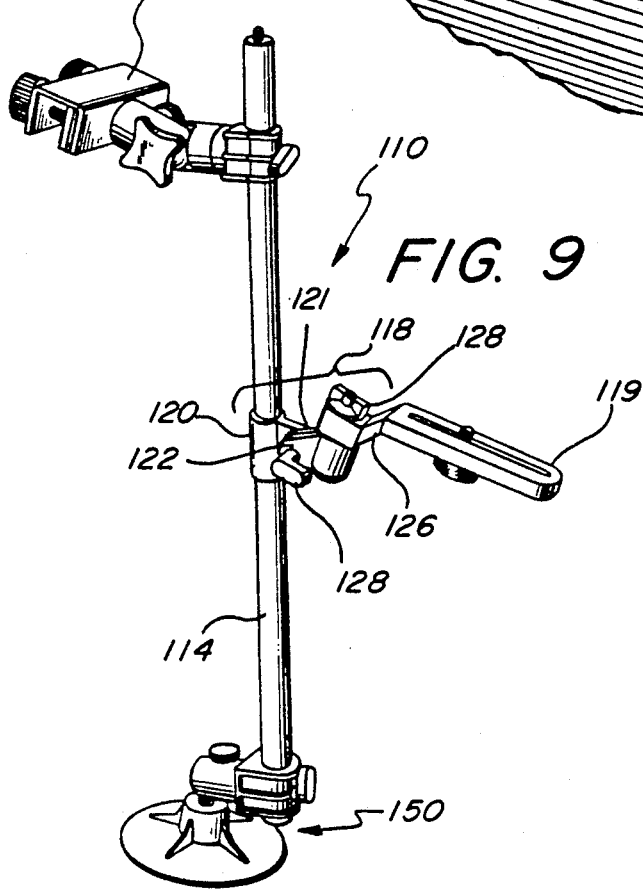
FIG. 9 is a perspective view of an alternate embodiment of a camera support frame adapted for use with the self-leveling camera support standard of FIGS. 1—3, the alternate support frame being adapted for attachment to an automobile door.
Figure 10:
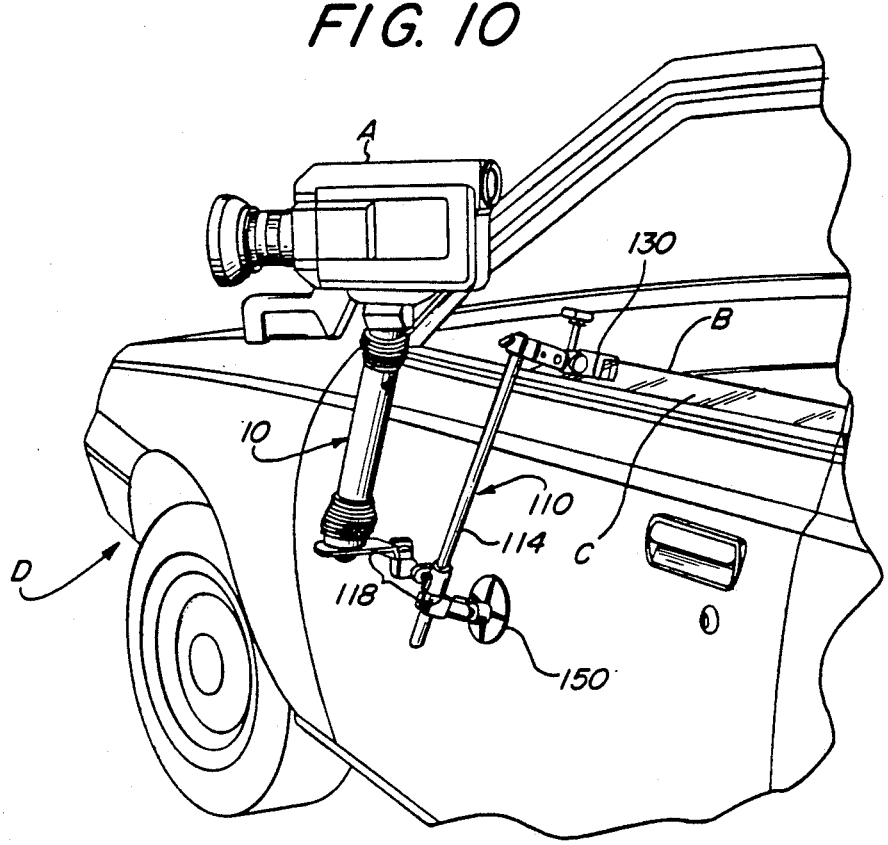
FIG. 10 is a perspective view of the apparatus of FIG. 9, showing the apparatus attached to an automobile door.

FIGS. 9 and 10 illustrate another camera support frame adapted to holding the camera support standard 10 according to the present invention, which alternate frame is adapted to attachment to a vehicle. As shown in FIGS. 9 and 10, the vehicle-mount camera support frame 110 includes a stanchion tube 114 similar in structure and function to vertical tube 54 described above as part of camera support frame 50. Thus, vehicle-mount camera support frame 110 includes a platform support clamp 118 for supporting a camera support arm 119 at a desired longitudinal position, or height, along stanchion tube 114. Platform support clamp 118 thus has a split tubular section 120 which has radially outwardly extending flange sections 121 and 122 having aligned through-holes for receiving a threaded rod. A base member 126 for supporting camera support arm 119 has a seating surface for seating flange section 121 of platform support clamp 118. When a wing nut 128 is tightened down onto the threaded rod threaded into a hole in base member 126, tubular section 120 of platform support clamp 118 is secured to tube 114.

Vehicle-mount camera support frame 110 also includes an inverted U-shaped channel clamp 130 for attachment to the upper edge of a lowered window of a vehicle, and a lower flat circular pad section 150 for supporting the lower end of tube 114 against the outer body surface of a vehicle. Thus, as shown in FIG. 10, upper channel clamp 130 may be adjusted to a desired height of tube 114, near its upper end, secured to the tube, and secured to upper edge B of window C of vehicle D. Also, as shown in FIG. 10, circular pad section 150 may be adjusted to a desired height of tube 114, near the lower end of the tube, and secured to the tube. Then, platform support clamp 118 may be secured to tube 114 in a position providing convenient support for self-leveling camera support standard 10.

Figure 12:
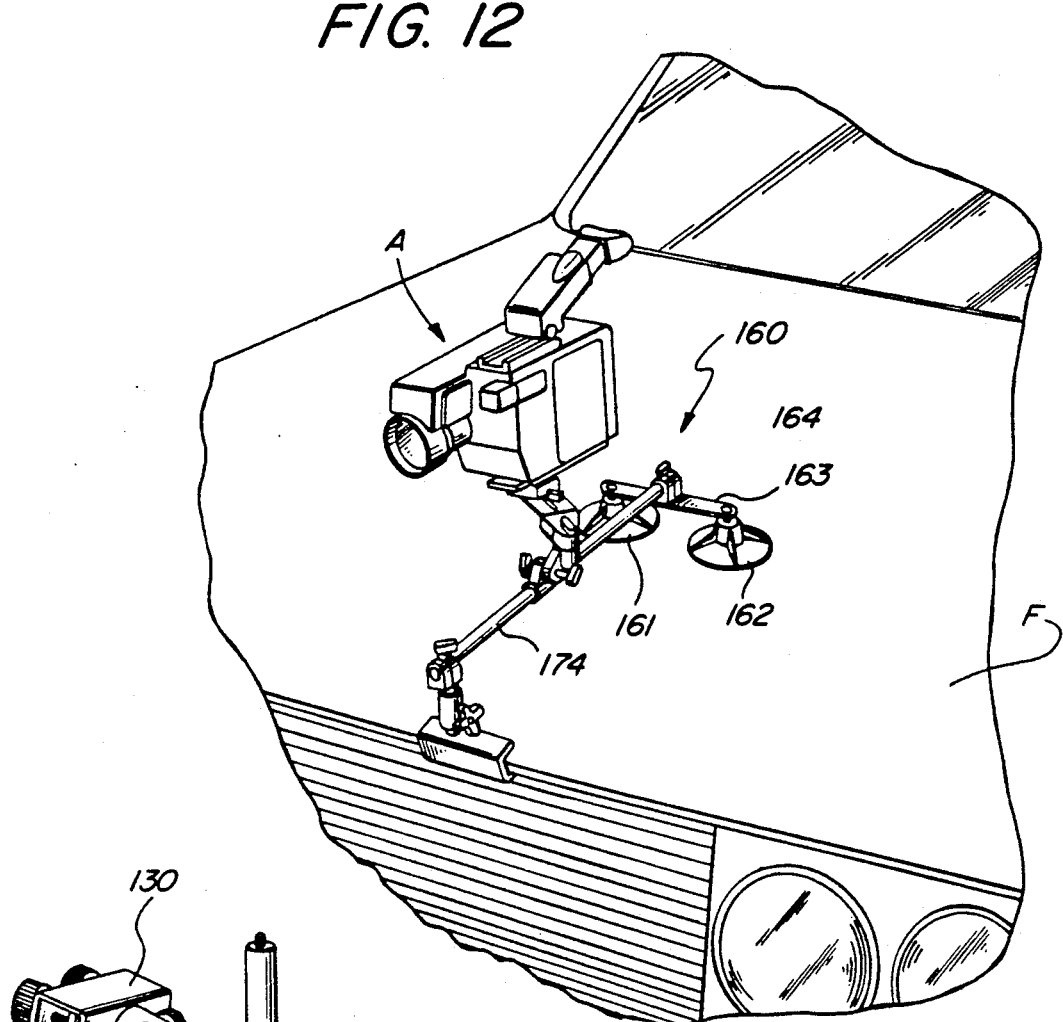
FIG. 12 is a perspective view of the apparatus of FIG. 11, showing the apparatus attached to the hood of an automobile.
Figure 11:
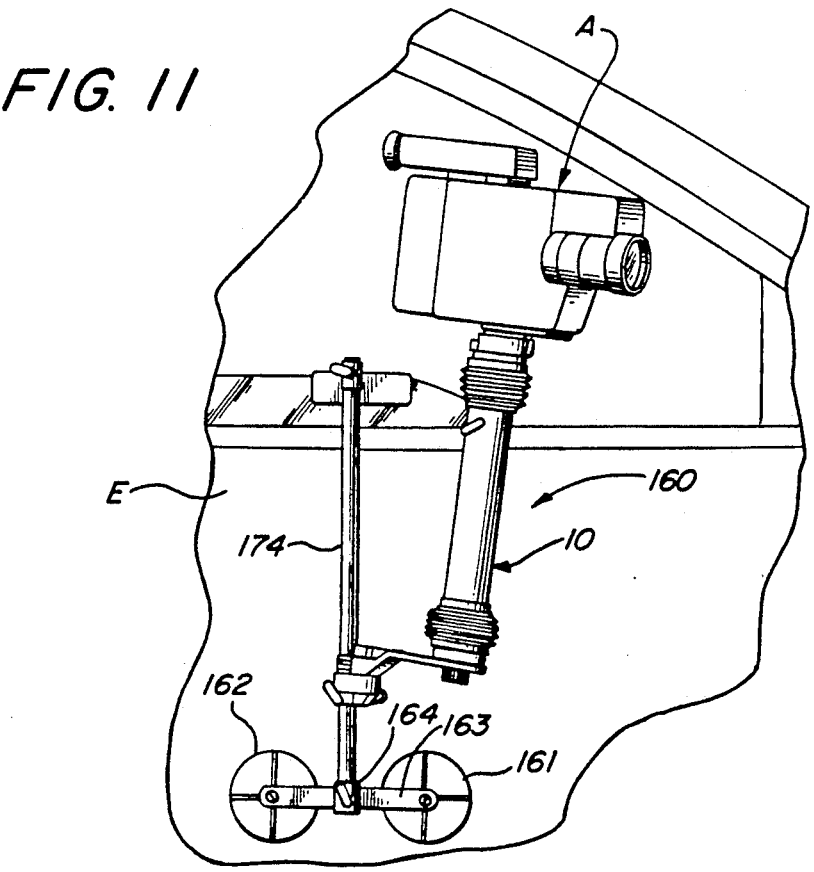
FIG. 11 is a perspective view on an alternate embodiment of the apparatus shown in FIGS. 9 and 10.

An alternate embodiment of the apparatus of FIGS. 9 and 10 is shown in FIGS. 11 and 12. In the alternate embodiment vehicle-mount camera support frame 160 shown in FIGS. 11 and 12, the lower circular pad section of vehicle-mount support frame 110 is replaced by two generally flat circular pads 161 and 162 disposed perpendicularly to opposite lateral ends of a laterally disposed bar 163 having a centrally located clamp 164 for adjustable attachment to the lower end of a stanchion tube 174. Thus constructed, vehicle-mount camera support frame 160 is adapted to attachment to an automobile door E, as shown in FIG. 11, or alternatively, to an automobile hood F, shown in FIG. 12.

What is claimed is:

1. A device for supporting an optical instrument at a fixed distance relative to a mounting point and allowing said instrument to be pivotably moved with respect to said mounting point while maintaining the optical axis or line of sight of said instrument parallel to a plane fixed relative to said mounting point, said device comprising:
   (a) an elongated standard,
   (b) a plurality of at least three spaced apart support rods oriented parallel to the longitudinal axis of said standard,
   (c) means for longitudinally slidably containing said support rods within said standard,
   (d) an instrument support cap having an upper, instrument-supporting surface pivotably joined at its lower surface to an upper end of each of said support rods, and
   (e) a base cap having a lower base mounting surface pivotably joined at its upper surface to a lower end of each of said support rods, whereby said instrument support cap may be pivotably moved with respect to said base cap, while maintaining the upper, instrument mounting surface of said instrument support cap at a fixed dihedral angle with respect to the lower, base mounting surface of said base cap.

2. The device of claim 1 wherein said support rods are of equal length.

3. The device of claim 2 wherein said standard is straight.

4. The device of claim 3 wherein said standard has the general shape of a right circular cylinder which is at least partially hollow, said cylinder having upper and lower transverse wall surfaces.

5. The device of claim 4 further including means for biasing said instrument support cap and said base cap away from the upper transverse wall surface and lower transverse wall surface, respectively, of said cylinder.

6. The device of claim 5 further including means for frictionally limiting the longitudinal slidability of said rods within said cylinder 7. The device of claim 4 wherein said means for longitudinally slidably containing said support rods within said standard comprises channel tubes contained within said standard.

8. The device of claim 7 wherein said channel tubes are circumferentially equidistant from one another.

9. The device of claim 8 wherein said channel tubes are further defined as three tubes spaced 120 degrees from one another.

10. The device of claim 1 further including frame means for supporting said lower base cap in fixed relationship to the body of a photographer.

11. The device of claim 1 further including frame means for supporting said lower base cap in fixed relationship to an automobile.

* * * * *